United States Patent
Gupta et al.

(10) Patent No.: US 10,785,299 B2
(45) Date of Patent: Sep. 22, 2020

(54) GENERATING CLOUD-HOSTED STORAGE OBJECTS FROM OBSERVED DATA ACCESS PATTERNS

(71) Applicant: Nutanix, Inc., San Jose, CA (US)

(72) Inventors: Karan Gupta, San Jose, CA (US); Bharat Kumar Beedu, Santa Clara, CA (US); Parthasarathy Ramachandran, Palo Alto, CA (US)

(73) Assignee: Nutanix, Inc., San Jose, CA (US)

( * ) Notice: Subject to any disclaimer, the term of this patent is extended or adjusted under 35 U.S.C. 154(b) by 120 days.

(21) Appl. No.: 15/176,731

(22) Filed: Jun. 8, 2016

(65) Prior Publication Data
US 2020/0036787 A1    Jan. 30, 2020

(51) Int. Cl.
*H04L 29/08* (2006.01)
*G06F 3/06* (2006.01)

(52) U.S. Cl.
CPC .......... *H04L 67/1097* (2013.01); *G06F 3/064* (2013.01); *G06F 3/0605* (2013.01); *G06F 3/067* (2013.01); *G06F 3/0647* (2013.01); *G06F 3/0653* (2013.01)

(58) Field of Classification Search
CPC ............... G06F 3/067; G06F 17/30212; G06F 17/30575; G06F 3/065; G06F 3/061; G06F 17/30171; G06F 17/30235; G06F 17/30902; G06F 9/546; H04L 67/2842; H04L 29/06; H04L 67/02
See application file for complete search history.

(56) References Cited

U.S. PATENT DOCUMENTS

| | | | |
|---|---|---|---|
| 6,577,679 B1 * | 6/2003 | Apostolopoulos ... | H04N 19/176 348/420.1 |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,535,626 B1 * | 1/2017 | Haas ..................... | G06F 3/0614 |
| 9,563,385 B1 * | 2/2017 | Kowalski ............. | G06F 3/0665 |
| 9,772,866 B1 | 9/2017 | Aron et al. | |
| 9,886,215 B1 * | 2/2018 | Ramachandran ....... | G06F 3/067 |

(Continued)

OTHER PUBLICATIONS

Wikipedia. "Amazon Elastic Block Store". Aug. 2008. 1 page.
(Continued)

*Primary Examiner* — Ninos Donabed
(74) *Attorney, Agent, or Firm* — Vista IP Law Group, LLP

(57) ABSTRACT

A method embodiment commences upon identifying an on-premises storage area such as a file or virtual disk that is composed of a set of data blocks. A history of data access patterns over the data blocks is determined by observing accesses to the data blocks over time. When offsite storage is demanded (e.g., such as to a cloud-based storage facility), one or more storage objects are formed such that the blocks in a first one of the one or more storage objects comprise the blocks that have been measured to have the highest access rates (e.g., most recently accessed or most frequently accessed). Metadata that serves as a map is stored with the storage objects. A process or thread can access the storage objects in expectation that the most recently accessed or most frequently accessed blocks will be available in the first ones of the one or more storage objects.

29 Claims, 10 Drawing Sheets

(56) References Cited

U.S. PATENT DOCUMENTS

| | | | | |
|---|---|---|---|---|
| 2002/0019751 | A1* | 2/2002 | Rothschild | H04N 1/00212 705/3 |
| 2002/0128862 | A1* | 9/2002 | Lau | G06Q 10/10 705/2 |
| 2003/0146834 | A1* | 8/2003 | Stevens | A01J 5/007 340/531 |
| 2003/0149698 | A1* | 8/2003 | Hoggatt | G06F 17/30958 |
| 2006/0010233 | A1* | 1/2006 | Fellenstein | G06F 11/3414 709/224 |
| 2006/0041330 | A1* | 2/2006 | Ansari | G06Q 10/087 700/240 |
| 2006/0271530 | A1* | 11/2006 | Bauer | G06F 17/30094 |
| 2008/0040465 | A1* | 2/2008 | Koster | H04L 41/024 709/223 |
| 2008/0133609 | A1* | 6/2008 | Lee | G06F 16/13 |
| 2009/0119604 | A1* | 5/2009 | Simard | G06Q 10/10 715/757 |
| 2010/0123792 | A1* | 5/2010 | Nagumo | H04N 5/145 348/222.1 |
| 2010/0131545 | A1* | 5/2010 | Srivastava | G06F 17/30575 707/769 |
| 2010/0198420 | A1* | 8/2010 | Rettger | G01W 1/10 700/291 |
| 2010/0332536 | A1* | 12/2010 | Ramaswamy | G06F 17/30194 707/770 |
| 2011/0143669 | A1* | 6/2011 | Farrell | H04M 1/6091 455/41.2 |
| 2011/0208543 | A1* | 8/2011 | Connolly | A61B 5/022 705/3 |
| 2012/0129608 | A1* | 5/2012 | Stegman | G07F 17/3234 463/42 |
| 2012/0179723 | A1* | 7/2012 | Lin | G06F 11/2094 707/792 |
| 2012/0260037 | A1* | 10/2012 | Jibbe | G06F 11/1076 711/114 |
| 2013/0007436 | A1* | 1/2013 | Bookman | G06F 3/0638 713/2 |
| 2013/0185229 | A1* | 7/2013 | Naga | G06F 12/123 705/418 |
| 2014/0006354 | A1* | 1/2014 | Parkison | G06F 3/0611 707/649 |
| 2014/0052764 | A1* | 2/2014 | Michael | G06F 17/30221 707/822 |
| 2014/0164328 | A1* | 6/2014 | Calo | G06F 17/30575 707/626 |
| 2015/0134625 | A1* | 5/2015 | Lentini | G06F 17/30303 707/692 |
| 2015/0169612 | A1* | 6/2015 | Kashyap | G06F 3/06 707/692 |
| 2016/0149888 | A1* | 5/2016 | Ancin | G06F 15/17331 726/4 |
| 2016/0210308 | A1* | 7/2016 | Shekhar | G06F 16/178 |
| 2017/0177249 | A1* | 6/2017 | Kurilov | G06F 11/0751 |

OTHER PUBLICATIONS

Wikipedia. "Amazon S3". Dec. 23, 2014. 7 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.

* cited by examiner

GENERATING CLOUD-HOSTED STORAGE OBJECTS FROM OBSERVED DATA ACCESS PATTERNS

FIELD

This disclosure relates to distributed data storage, and more particularly to techniques for generating cloud-hosted storage objects based on observed data access patterns.

BACKGROUND

Today's distributed storage systems have evolved to comprise autonomous nodes that facilitate incremental and/or linear scaling of resources needed to save and manage vast quantities of stored data. One benefit provided by distributed storage systems is the ability to distribute stored data throughout the nodes in a given cluster. Many distributed storage systems implement data snapshot techniques to capture the state of stored data at a particular time. Such snapshots can serve as virtual copies of various sets of data to facilitate data protection (e.g., recovery of a corrupted file, data availability during a full region outage, etc.). In some cases, the snapshots might be moved from one distributed storage environment to another distributed storage environment. For example, a subject snapshot (e.g., logical file, or virtual disk or vDisk, etc.) might be initially stored in a cloud-based persistent block storage facility (e.g., Amazon elastic block store or Amazon EBS) to provide high performance (e.g., fast access, low-latency, etc.) and high availability. At some moment in time (e.g., after additional snapshots have been taken), a subject snapshot might be stored as one or more off-premises storage objects (e.g., physically contiguous or logically contiguous data) in an off-premises network-accessible object storage facility (e.g., Amazon simple storage service or Amazon S3). Such replication (e.g., to an off-premises facility) serves to provide lower costs for persistent storage. In some cases, the set of data blocks comprising such objects might not have any logical associations between each other except for a correspondence to access patterns (e.g., a historically high frequency of use). Further, in some cases, the data blocks comprising such objects might not even have any logical associations with the processes or files that generated the set of data blocks.

Unfortunately, legacy techniques to determine the composition of the off-premises storage objects for storage in the object storage facility have limitations, at least with respect to their ability to generate objects that are constructed to minimize object access latency during certain operations. For example, some legacy techniques might merely divide the subject snapshot data (e.g., 100 GB) into equally sized (e.g., 1 MB) chunks that can be associated with respective objects (e.g., ~1 MB objects) to be stored in the object storage facility. In this case, the object might comprise logically unassociated data blocks such that certain operations (e.g., booting an operating system, invoking an application, etc.) might require access to data blocks from many objects, even though only a few blocks from each object are accessed. Such multi-object access is undesirable, at least since multiple object accesses will increase execution times for certain operations. Moreover multi-object access is undesirable since multiple object accesses increases usage of computing resources, decreases user satisfaction, and/or has other detrimental effects.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for generating off-premises storage objects from data access patterns, which techniques advance the relevant technologies to address technological issues with legacy approaches. More specifically, the present disclosure provides a detailed description of techniques used in systems, methods, and in computer program products for generating off-premises storage objects from data access patterns. Certain embodiments are directed to technological solutions for capturing data access patterns to generate objects comprising sequentially accessed data blocks for storage in an off-premises network-accessible object storage facility, which embodiments advance the relevant technical fields as well as advancing peripheral technical fields.

The disclosed embodiments modify and improve over legacy approaches. In particular, the herein-disclosed techniques provide technical solutions that address the technical problems attendant to determining the data blocks from a distributed storage environment to group into objects to be stored in an off-premises network-accessible object storage facility that is void of logical data association information pertaining to the data blocks. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
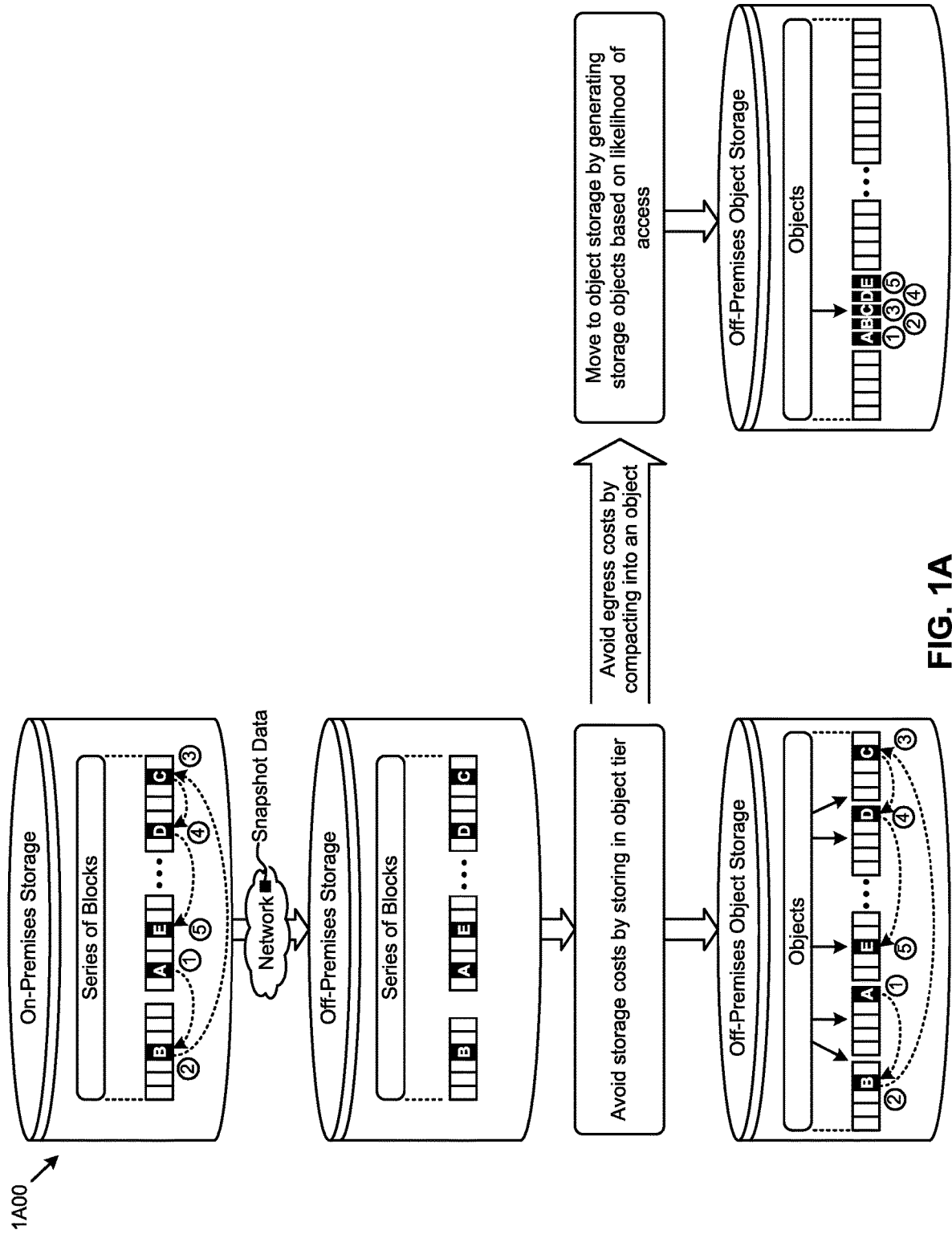
FIG. 1A presents a cloud-based object storage technique.

Some embodiments of the present disclosure address the problem of determining which data blocks from a distributed storage environment to group into objects to be stored in a cloud-hosted object storage facility (e.g., an object storage facility that is void of logical data association information pertaining to the data blocks). Some embodiments are directed to approaches for capturing data access patterns to generate objects comprising sequentially accessed data blocks for storage in an off-premises network-accessible object storage facility.

Overview

Disclosed herein are techniques for capturing data access patterns that are used to compose storage objects comprising sequentially accessed data blocks, and then presenting the contents of the storage objects for storage in an off-premises network-accessible object storage facility. In certain embodiments, access pattern capture trigger signals can be implemented in various operations to capture access pattern attributes (e.g., data block identifier, address offset, sequence identifier, timestamp, etc.) of the data blocks accessed during the operations that can be used to generate the storage objects. In some embodiments, metadata can be generated to map data blocks to one or more objects to be accessed by the operations. Further, object access can be determined based in part on various heuristics applied to the operation request.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A presents a cloud-based object storage technique 1A00. As an option, one or more variations of cloud-based object storage technique 1A00 or any aspect thereof may be implemented in the context of the architecture and functionality of the embodiments described herein. The cloud-based object storage technique 1A00 or any aspect thereof may be implemented in any environment.

The figure depicts a migration from a series of blocks to an object—oriented storage facility. Various vendors (e.g., cloud vendors) offer off-premises block-oriented persistent storage (e.g., as one storage tier) as well as off-premises object storage (e.g., as another storage tier). There are many differences between block-oriented storage (i.e., off-premises block-oriented persistent storage) and object storage (i.e., off-premises object storage), not the least of which relates to the cost of usage. For example, off-premises block-oriented persistent storage might be offered with a high-performance service level agreement (SLA) that promises to deliver lower latency access as a tradeoff to a relatively higher cost as compared to off-premises object storage that promises relatively lower cost as a tradeoff against higher latency access.

Off-Premises Object Storage

Off-premises object storage is distinguished from off-premises block-oriented storage at least in that off-premises object storage operates in a lower-tier storage architecture that manages data as objects, as opposed to other storage architectures like file systems that manage data in a hierarchical file mapped onto a storage device having blocks within sectors and tracks. Off-premises object storage objects are often characterized by (1) the data itself, (2) a variable amount of metadata, and (3) a unique identifier of the object. Object storage can be offered as a lower tier from among several "higher" and/or "lower" information life cycle management tiers. Off-premises object storage offers capabilities that are not offered natively by other storage architectures. For example, access to objects can be made directly an application (e.g., by issuing a database system query, or by using a name or identifier namespace that can span multiple instances of physical hardware). Object storage is often used for retention of massive amounts of unstructured data.

Off-Premises Block-Oriented Persistent Storage

Off-premises block-oriented persistent storage relies on a file system that is used to control how data is stored and retrieved. There are many different kinds of file systems. Each one has various structure (e.g., file layout), logic, properties of speed, flexibility, security, size and etc. Off-premises block-oriented persistent storage tiers often use hard disk drives and/or solid state drives for persistent storage. Off-premises block-oriented persistent storage offerings have access characteristics that differ from off-premises object storage offerings. A stored item using off-premises block-oriented persistent storage can be addressed and retrieved down to small portions the item's constituent components (e.g., a block of a file), whereas off-premises object storage objects are addressed as a whole item (e.g., by a name) and retrieved as a whole by retrieving the entire object.

Observing Access Patterns

A series of blocks (e.g., logical file or virtual disk) might correspond to a particular access pattern. As shown, a history of observations of usage might indicate that block A is accessed frequently, as is block B and block C and block D and block E. The history might further indicate that the other blocks in the series of blocks are not accessed at all, or not frequently. Nevertheless, a snapshot of the series of blocks might be taken and stored in off-premises storage. That snapshot might be later moved off to a lower-cost storage tier, which would serve to avoid some cloud storage costs. Still lower costs can be achieved by reorganizing the series of blocks in accordance with some set of observations. More specifically, egress costs can be avoided if the blocks that are likely to be retrieved from the cloud storage are organized into an object. As shown in the example of FIG. 1A, all of the blocks that are deemed (e.g., by considering a history of access) to be likely to be retrieved are collocated into one object. The other objects may never (or infrequently) be retrieved. As such, egress costs are decreased as compared with retrieving many objects, some of which might not contain any blocks that are likely to be used.

Figure 1B:
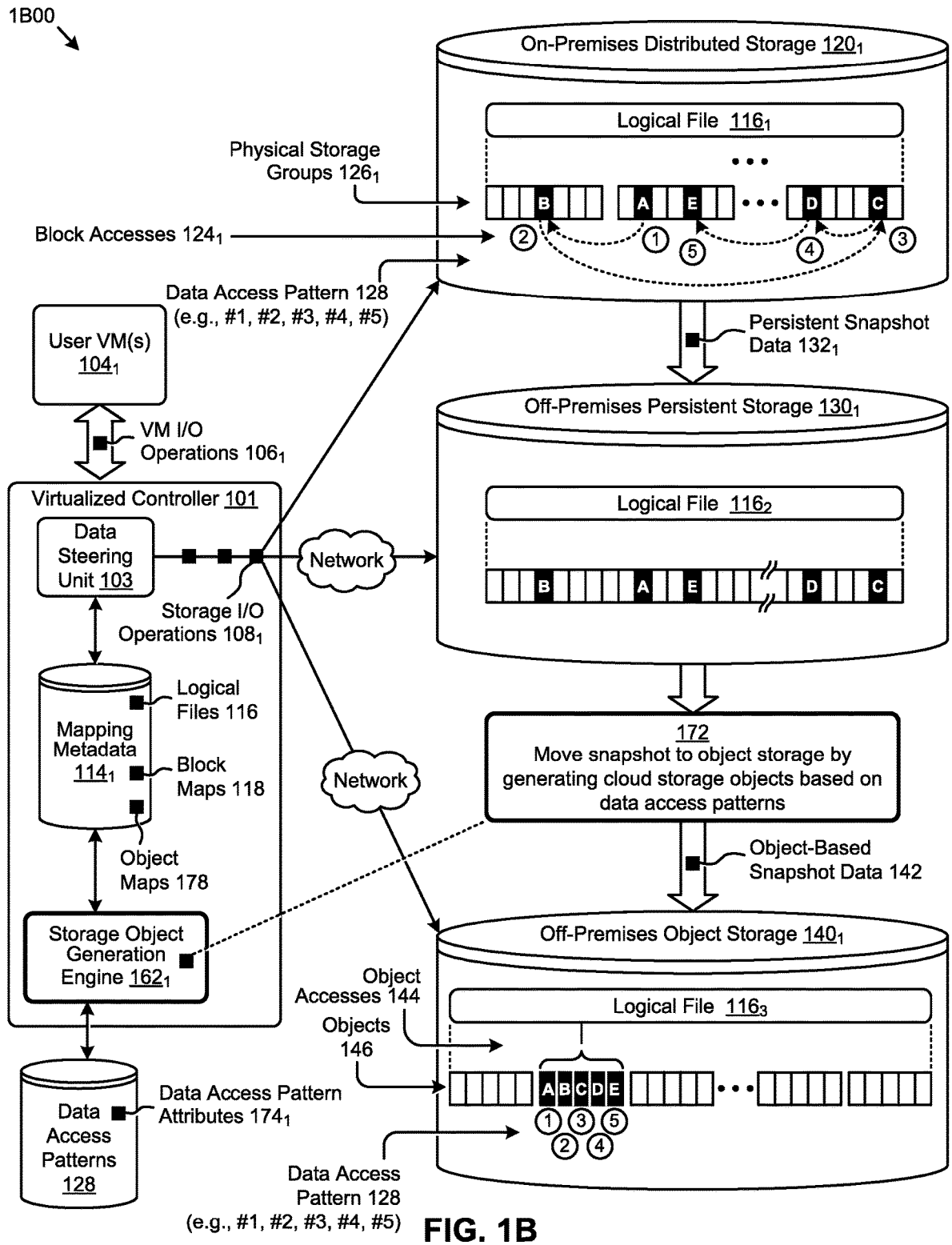
FIG. 1B illustrates an environment for generating off-premises storage objects from data access patterns, according to an embodiment.

FIG. 1B illustrates an environment for generating off-premises storage objects from data access patterns. As an option, one or more variations of object creation technique 1B00 or any aspect thereof may be implemented in the context of the architecture and functionality of the embodiments described herein.

A node in a cluster of a distributed computing and storage system might have a virtualized controller 101 that services a set of user VMs $104_1$. Certain instances of VM I/O (input/output or IO) operations (e.g., VM I/O operations $106_1$) can be issued by the user VMs $104_1$ to perform various computing and/or storage operations, such as storage I/O operations $108_1$ (e.g., data READ operations, data WRITE operations, etc.). Specifically, the virtualized controller 101 can interface with one or more instances of a data steering unit 103 to access (e.g., READ, WRITE) data stored on various storage facilities. For example, data accessible by the user VMs $104_1$ can be sent by the virtualized controller 101 to on-premises distributed storage $120_1$. In some cases, the on-premises distributed storage $120_1$ can comprise various physical storage devices (e.g., PCIe SSD devices, SSD devices, HDD devices, etc.) that can be accessed by multiple nodes in the cluster to provide multiple instances of physical storage groups $126_1$ (e.g., extent groups) comprising various data blocks (e.g., extents). A set of mapping metadata $114_1$ holds virtual or logical representations of one or more storage areas comprising a collection of data blocks or logical files 116 (e.g., virtual disks or vDisks, etc.) to provide data access by the user VMs $104_1$ and/or for other purposes (e.g., any access by a computer processor, any access by a process or task, any application such as snapshotting, etc.). As an example, a logical file $116_1$ might be a vDisk representing the physical storage groups $126_1$ accessible by the user VMs $104_1$. More specifically, various instances of block maps 118 can also be stored in the mapping metadata $114_1$ to map the logical data blocks comprising the logical file $116_1$ to the data blocks comprising the physical storage groups $126_1$.

The virtualized controller 101 can use the mapping metadata $114_1$ and/or other information to form the storage I/O operations $108_1$ that carry out one or more of the VM I/O operations $106_1$. In some cases, the storage I/O operations $108_1$ corresponding to the VM I/O operations $106_1$ can result in a number of block accesses characterized by one or more data access patterns. As an example, a set of observations of a boot sequence might result in a historical set of block accesses $124_1$ corresponding to executing five data blocks (e.g., A, B, C, D, and E) in a data access pattern 128.

At some moment in time, the distributed computing and storage system might move a snapshot of the logical file $116_1$ comprising a set of persistent snapshot data $132_1$ represented by a logical file $116_2$ to off-premises block-oriented persistent storage, which logical file may be stored in a second block storage configuration. For example, snapshots stored in the off-premises block-oriented persistent storage $130_1$ (e.g., cloud-based persistent block storage facility such as Amazon EBS) can provide high performance (e.g., fast access, low-latency, etc.) data availability for certain data protection and/or data integrity capabilities (e.g., recovery of a corrupted file, data availability during a full region outage, etc.). In such cases, the virtualized controller 101 might make a determination for a given instance of the user VMs $104_1$ and/or a given instance of the VM I/O operations $106_1$ as to the location (e.g., on-premises distributed storage $120_1$, off-premises block-oriented persistent storage $130_1$, etc.) of the data to be accessed to service the given VM I/O operation. The storage I/O operations $108_1$ and/or the instance of the storage access layer $112_1$ accessed by the virtualized controller can in turn be determined based on the data location.

At another moment in time, the distributed computing and storage system might receive a request to move a snapshot of the logical file $116_2$ to an off-premises object storage $140_1$. For example, the off-premises object storage $140_1$ (e.g., off-premises network-accessible object storage facility such as Amazon S3) can provide high capacity and long-term storage while offering lower costs (e.g., as a tradeoff for higher latency to access the objects). In some cases such off-premises object storage might correspond to a second or Nth tier of storage in a multi-tier information life cycle management (ILM) regime.

Some techniques accrue lower ongoing costs by moving the snapshot to object storage by merely dividing the snapshot addressable space to create the data objects. In one example, a snapshot might be divided equally to create a set of objects having a certain size determined by a set of sized-based object boundaries. For example, a 1 GB linear addressable space might be divided into 1000 objects each 1 MB in size. The size (e.g., 1 MB) of the objects might be based on various tradeoffs and/or constraints pertaining to managing the data movement.

Improved techniques can be used to generate objects that minimize the object access latency during certain operations. For example, the objects can comprise data blocks that are distributed such that certain patterns of the VM I/O operations $106_1$ (e.g., booting an operating system, invoking an application, etc.) might require access to various data blocks from multiple objects. Specifically, multiple instances of object accesses might be needed to access the five data blocks (e.g., A, B, C, D, and E). Such multi-object accesses can increase execution times for certain operations, increase usage of computing resources, decrease user satisfaction, and/or have other detrimental effects. Such issues and/or other problems attendant to generating objects for off-premises object storage can be addressed by the herein disclosed techniques for generating off-premises storage objects from data access patterns as described in FIG. 1B and throughout.

Specifically, and as is shown in FIG. 1B, an object creation technique can be used to reduce egress costs. The object creation technique 1B00 illustrates one embodiment and the resulting effects of the implementation of the herein disclosed techniques for generating off-premises storage objects from an observed history of data access patterns. FIG. 1B depicts the virtualized controller 101 that services the VM I/O operations $106_1$ from the user VMs $104_1$ to perform various computing and/or storage operations, such as storage I/O operations $108_1$. The mapping metadata $114_1$ comprising the logical files 116 and block maps 118 are also shown. The virtualized controller 101 can interface with one or more instances of the storage access layer $112_1$ to access data stored on various storage facilities, such as the on-premises distributed storage $120_1$, the off-premises block-oriented persistent storage $130_1$, the off-premises object storage $140_1$, and/or other storage facilities. As earlier described, the on-premises distributed storage $120_1$ can contain a logical file $116_1$ in a first block storage configuration comprising the physical storage groups $126_1$. The foregoing boot sequence example can be characterized by a set of block accesses $124_1$ corresponding to executing five data blocks (e.g., A, B, C, D, and E) in a data access pattern 128. The off-premises block-oriented persistent storage $130_1$ can store a snapshot of the logical file $116_1$ comprising the shown persistent snapshot data $132_1$ (e.g., as illustrated by logical file $116_2$).

In some embodiments, the virtualized controller 101 can be an instance of a virtual machine that serves to perform or facilitate certain system control functions. As shown, the virtualized controller 101 can be implemented by a control virtual machine (e.g., see control VM $154_1$ of FIG. 2) which in turn can comprise a storage object generation engine $162_1$ to facilitate performance of the herein disclosed techniques. Specifically, the storage object generation engine $162_1$ might receive a request to move a snapshot of the logical file $116_2$ comprising a set of object-based snapshot data 142 to the off-premises object storage $140_1$. Still more specifically, the storage object generation engine $162_1$ can move the snapshot to object storage by generating the off-premises storage objects based on one or more data access patterns (operation 172). In certain embodiments, the storage object generation engine $162_1$ can capture certain instances of data access pattern attributes $174_1$ to characterize a set of data access patterns 128. The data access patterns 128 can then be used to select data blocks that are associated (e.g., accessed in sequence to execute an operation) in the data access patterns 128 for grouping into one or more objects. The resulting objects (e.g., objects 146) can be moved to the off-premises object storage $140_1$ (e.g., cloud-based object storage). In some embodiments, the data blocks (e.g., the data blocks of logical file $116_3$) can be associated with the objects 146 in a set of object maps 178 (e.g., stored in the mapping metadata $114_1$). In other embodiments, object maps and/or other metadata can be appended to the objects 146. Even though the organization of the contents of the logical file $116_3$ may be different from the organization of the contents of logical file $116_2$ or of logical file $116_1$, the aggregation of the contents of the objects 146 can be used to reconstruct the original instance of logical file $116_1$.

Off-premises object storage differs from the aforementioned block-oriented storage at least as aspects pertaining to latency of access, cost of storage SLA-defined reliability, and so on. For example, whereas the aforementioned block-oriented storage might offer a relatively lower average access time (e.g., due to physical storage in solid state drives), object oriented storage access might incur relatively higher average latency (e.g., due to physical storage in rotating media drives or on magnetic tapes or other archival media). Moreover, availability might be relatively higher for block-oriented storage (e.g., 99.9999% uptime), whereas availability for object storage might be relatively lower (e.g., 98% uptime).

In spite of relatively higher average latency when accessing object storage, the one characteristic of the herein disclosed techniques as illustrated by the object creation technique 1B00 is a reduction in object accesses for certain operations (e.g., booting from an OS in a virtual machine setting). For example, the just one occurrence of object accesses 144 to access blocks A, B, C, D, and E can be compared to the five occurrences of object accesses if the contents (e.g., blocks A, B, C, D, and E) of the objects were distributed throughout the objects. In such cases, the herein disclosed techniques are effectively providing data block associations using the data access patterns, even when storing in an environment that is void of the original logical data association information pertaining to the data blocks.

Other benefits of the herein disclosed techniques are possible. As earlier mentioned, the problems addressed by the herein disclosed techniques can be prevalent in highly active storage I/O distributed storage environments. Such an environment is described as pertains to FIG. 2.

Figure 2:
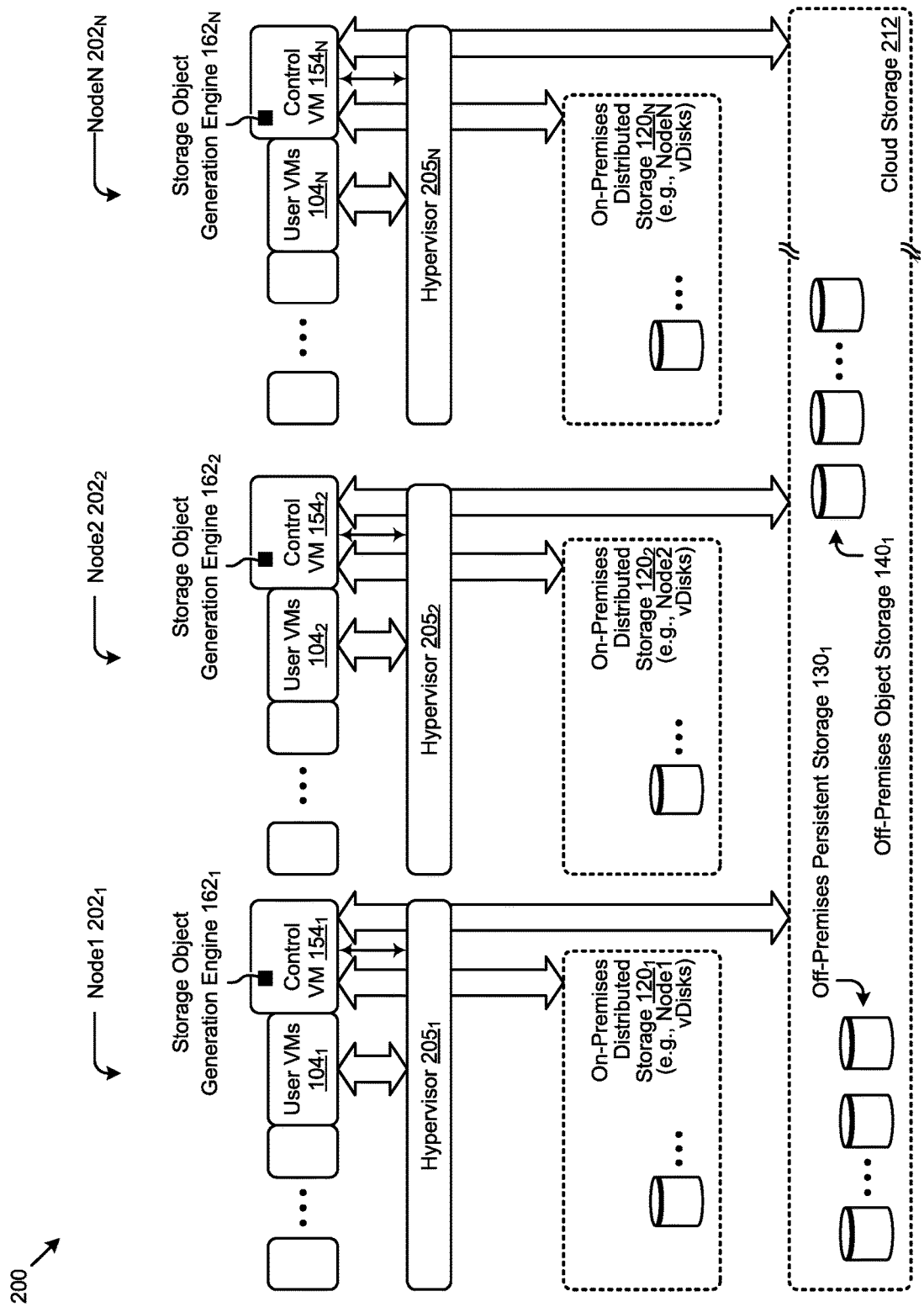
FIG. 2 shows an environment in which embodiments of the present disclosure can operate.

FIG. 2 shows an environment 200 in which embodiments of the present disclosure can operate. As an option, one or more variations of environment 200 or any aspect thereof may be implemented in the context of the architecture and functionality of the embodiments described herein.

As shown in the environment 200, a group of nodes (e.g., node1 $202_1$, node2 $202_2$, . . . , nodeN $202_N$) can form a distributed storage and compute platform that comprises a distributed storage fabric. The distributed storage fabric can appear to an instance of a hypervisor (e.g., hypervisor $205_1$, hypervisor $205_2$, . . . , hypervisor $205_N$) and associated user virtual machines (e.g., user VMs $104_1$, user VMs $104_2$, . . . , user VMs $104_N$, respectively) at each node as a centralized storage array; however, storage I/O operations can be processed in a manner that is local to each node (e.g., by a local virtualized controller such as control VM $154_1$, control VM $154_2$, . . . , control VM $154_N$) so as to provide high performance. Strictly as examples, inter-component communication within the environment 200 includes communication between a user VM and a hypervisor, communication between a control VM and a hypervisor, as well as communication between a control VM and various on-premises storage and/or between a control VM and various types of cloud storage (e.g., off-premises persistent storage $130_1$ and/or off-premises object storage $140_1$).

The hypervisor at each node can be an industry standard hypervisor (e.g., ESXi, KVM, Hyper-V, etc.). The virtualized controllers at each node can process I/O operations for the respective hypervisor and user VMs. As an example, a user VM might access a vDisk by making a call to a hypervisor instance. The hypervisor is configured (e.g., by a virtualized controller) to forward storage I/O calls to the virtualized controller. The virtualized controller in turn can forward storage I/O call to any form of storage (e.g., on-premises storage, off-premises storage, etc.).

In some cases, the virtualized controllers can interface with respective storage access layers that correspond to various storage facilities. Such storage facilities can comprise on-premises distributed storage (e.g., on-premises distributed storage $120_1$, on-premises distributed storage $120_2$, . . . , on-premises distributed storage $120_N$) and/or certain instances of off-premises storage, such as off-premises storage hosted at a remote location, or network-accessible facilities for remote storage (e.g., the shown cloud storage 212, the off-premises block-oriented persistent storage $130_1$, off-premises object storage $140_1$, etc.). The distributed storage fabric and/or the entire platform shown in environment 200 can be scaled by adding more nodes.

In some cases, the distributed storage fabric comprises or conforms to a multi-tier storage regime that includes "hot" persistent storage (e.g., as implemented using solid state drives) as well as "cold" storage (e.g., hard disk-based storage). A virtual machine such as the shown control VM $154_N$ may include a decision-making module that can determine of a particular storage I/O operation is to be directed to a first storage area (e.g., on-premises distributed storage) or to a second storage area (e.g., cloud storage 212).

The distributed storage fabric can be configured to react to various workloads and/or allow heterogeneous node capabilities (e.g., compute heavy, storage heavy, etc.). For example, ensuring near uniform distribution of data across a cluster can be important when mixing nodes with larger storage capacities. In some cases, such disk balancing can be implemented as a scheduled process invoked by a local storage capacity utilization having exceeded a certain threshold (e.g., 85% utilization). When an imbalance is identified, certain data blocks can be designated for moving, and associated storage I/O operations (e.g., data move operations) can be distributed to nodes in the cluster (e.g., using an internode communications link). For example, certain user VMs might be running on a node that is writing more data than other nodes, resulting in a skew in the storage capacity utilization for that node. In such cases, the disk balancing process can move the coldest data on the high utilization node to other lower utilization nodes in the cluster. In other cases, balancing within a node can occur. For example, data might be moved from an SSD device that is nearly fully used (e.g., 95%) to a lower tier local HDD device. In such cases, the data identified for migration can be based on the time of the last access (e.g., move colder data before hotter data).

In some cases, the foregoing disk balancing might occur within the on-premises distributed storage. In other cases, data might be moved from the on-premises distributed storage to the cloud storage for various purposes. For example, the distributed storage fabric can provide native support for offloaded cloud instances of data (e.g., snapshots, clones, remote sites, etc.) that can leverage the benefits of off-premises or cloud storage (e.g., high availability, lower cost, etc.). Such cloud instances might be used to facilitate cloud-based remote sites, data replication and/or retention policies, and/or other purposes. Specifically, for example, to support a data replication and/or retention policy, a snapshot of data might be moved from the on-premises distributed storage $120_1$ to the off-premises block-oriented persistent storage $130_1$ and then moved to the off-premises object storage $140_1$ (e.g., to cloud storage 212). In certain embodiments, instances of the storage object generation engine (e.g., storage object generation engine $162_1$, storage object generation engine $162_2$, . . . , storage object generation engine $162_N$, etc.) can be included in a respective instance of a virtual controller (e.g., a control VM or container) at each node (e.g., see control VM $154_1$, control VM $154_2$, . . . , control VM $154_N$) to facilitate such moves to the off-premises object storage $140_1$ according to the herein disclosed techniques. Further details describing such techniques are disclosed as pertains to FIG. 3.

Figure 3:
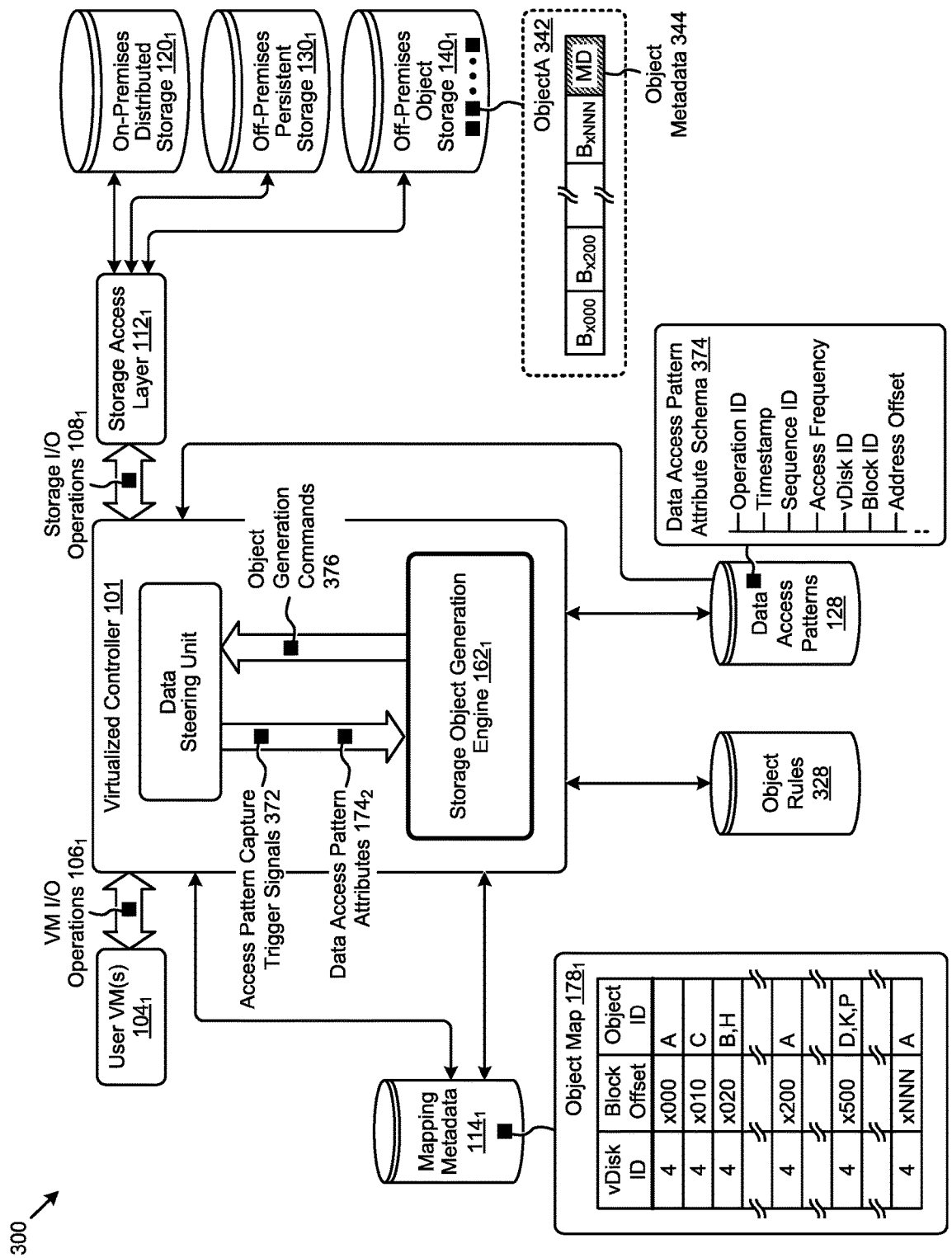
FIG. 3 presents a block diagram of a subsystem as used in systems for generating off-premises storage objects from data access patterns, according to some embodiments.

FIG. 3 presents a block diagram of a subsystem 300 as used in systems for generating off-premises storage objects from data access patterns. As an option, one or more variations of subsystem 300 or any aspect thereof may be implemented in the context of the architecture and functionality of the embodiments described herein. The subsystem 300 or any aspect thereof may be implemented in any environment.

The subsystem 300 presents one embodiment of components, data flows, data structures, and/or other aspects for implementing the herein disclosed techniques for generating off-premises storage objects from data access patterns. Specifically, the subsystem comprises a virtualized controller in the form of a containerized virtualized controller that services I/O operations from the user VMs to perform various computing and/or storage operations, such as storage I/O operations $108_1$. The virtualized controller 101 can use the mapping metadata $114_1$ and/or other information to generate the storage I/O operations $108_1$ to be interpreted (e.g., by the data steering unit) so as to determine the location or locations for the operation (or variant) to be performed on various storage facilities, such as the on-premises distributed storage $120_1$, the off-premises block-oriented persistent storage $130_1$, the off-premises object storage $140_1$, and/or other storage facilities.

To facilitate the herein disclosed techniques, the virtualized controller can comprise an instance of the storage object generation engine $162_1$ to receive various instances of access pattern capture trigger signals 372. For example, the access pattern capture trigger signals 372 can be implemented in one or more operations, processes, or sequences (e.g., boot sequence, application launch sequence, etc.) at the user VMs $104_1$ to invoke and/or end the capturing of various instances of data access pattern attributes $174_2$ by the storage object generation engine $162_1$. In some cases, the capture window (e.g., 2 seconds) for capturing the data access pattern attributes $174_2$ might be determined by a set of object rules 328. The data access pattern attributes $174_2$ might then be stored in the data access patterns 128 according to a data access pattern attribute schema 374. As an example, the data access pattern attribute schema 374 might comprise a table having rows corresponding to an access event and columns corresponding to various attributes, such as an operation identifier (e.g., Operation ID), a timestamp (e.g., Timestamp), a sequence identifier (e.g., Sequence ID), a logical file identifier or virtual disk identifier (e.g., vDisk ID), a data block identifier (e.g., Block ID), an address offset (e.g., Address Offset), and/or other attributes.

Strictly as examples, a sequence identifier can be captured to reflect an access pattern (e.g., first, second, third block access). An access frequency value can be captured to reflect a time-based access pattern corresponding to a particular operation (e.g., READ, WRITE) or set of operations over a particular block or set of blocks.

In certain embodiments, the storage object generation engine $162_1$ can invoke the generation of objects and/or move of objects to the off-premises object storage $140_1$ using one or more instances of object generation commands 376. As shown, the object generation commands 376 use the virtualized controller and/or the storage access layer $112_1$ to operate on the subject data stored in the various storage facilities. According to the herein disclosed techniques, the object generation commands 376 can generate objects such as the objectA 342 using the data access patterns 128. For example, the objectA 342 can comprise a data block at address offset x000 (e.g., $B_{x000}$), a data block at address offset x200 (e.g., $B_{x200}$), a data block at address offset xNNN (e.g., $B_{xNNN}$), and other data blocks associated by one or more instances of the data access patterns 128 and/or data access pattern attributes $174_2$. A set of object metadata 344 can also be appended to the objectA 342 to describe various characteristics (e.g., list of data block identifiers and associated address offsets, etc.) of the objectA 342.

An object map $178_1$ can also be generated as shown. The object map $178_1$, stored in the mapping metadata $114_1$, can be used by the virtualized controller to associate data blocks with the objects comprising the data blocks. For example, the object map $178_1$ might comprise a table having rows corresponding to each data block and columns describing various attributes of the data block, such as a logical file identifier or virtual disk identifier (e.g., vDisk ID), a data block address offset (e.g., Block Offset), an object identifier (e.g., Object ID), and/or other attributes. Specifically, the object map $178_1$ shows that the data blocks at block offset x000, x200, and xNNN are associated with Object ID "A" (e.g., ObjectA 342). In some cases, a given data block can be associated with multiple objects (e.g., data block at x020 is associated with object B and object H, etc.).

In some cases, the storage object generation engine $162_1$ might use certain instances of the object rules 328 to determine the objects for storage in the off-premises object storage $140_1$. For example, the object rules 328 might indicate a target size (e.g., 1 MB) of the objects based on historical performance data. The object rules 328 can also be dynamically updated by the storage object generation engine $162_1$ based on historical data access patterns.

For example, the particular set of blocks that are to be included in an object can be amalgamated on the basis of a particular observed sequence of access (e.g., first access to block 1, second access to block 300, third access to block 3, etc.), even when the pattern of access is random over the range of blocks.

In yet another example, the particular set of blocks might be amalgamated on the basis of a historical series of changes in a set of snapshots. Such an amalgamation would facilitate fetching for review of the series of snapshots.

As another example, historical data access patterns might show that the average size of a set of data blocks accessed sequentially is 2 MB, indicating the target object size rule in the object rules 328 might be increased from 1 MB to 2 MB to improve object access latency. Further, various heuristics applied to the data access patterns 128 might further be used by the virtualized controller to improve object access efficiency.

Figure 5:
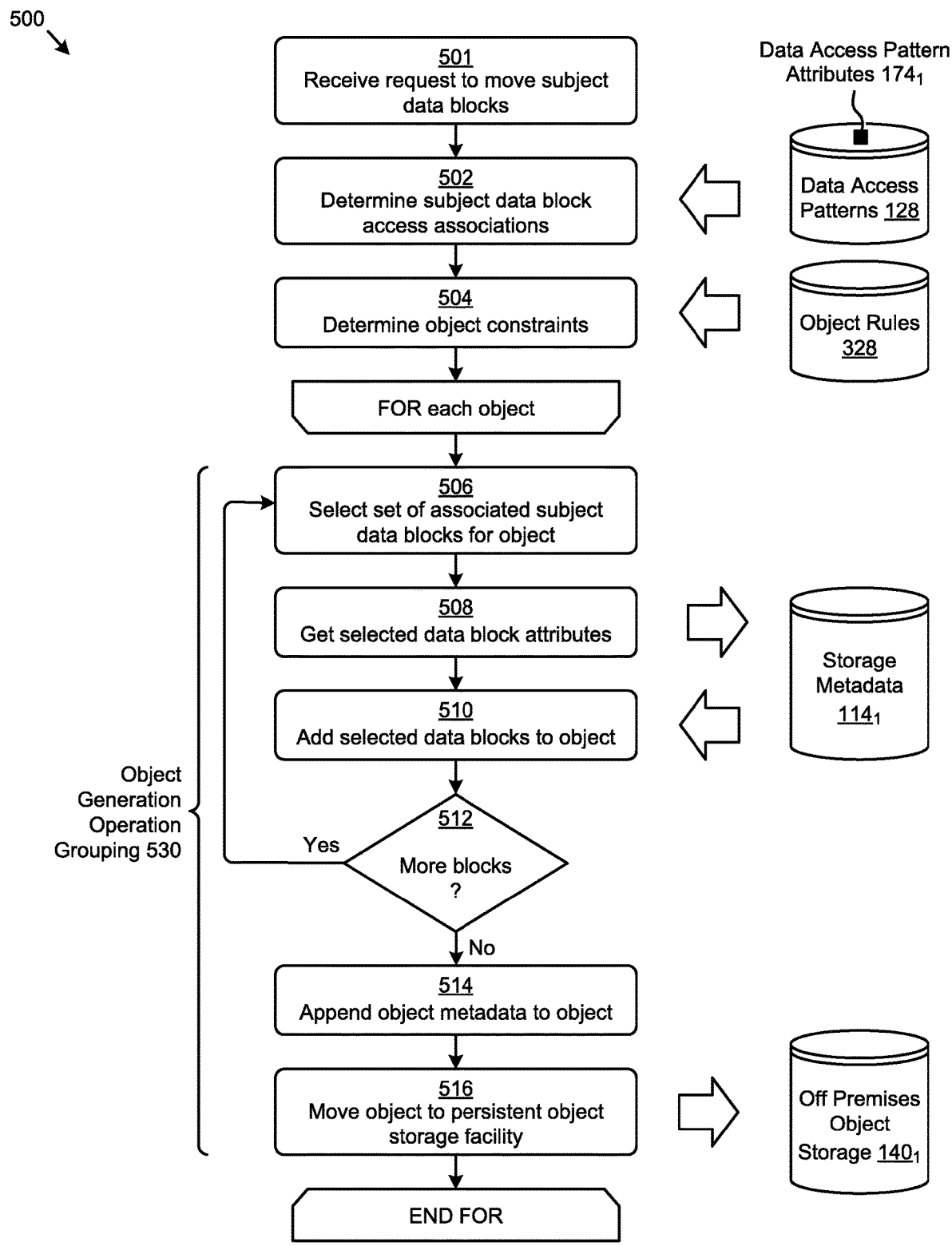
FIG. 5 depicts an object generation technique as implemented in systems for generating off-premises storage objects from data access patterns, according to some embodiments.
Figure 6:
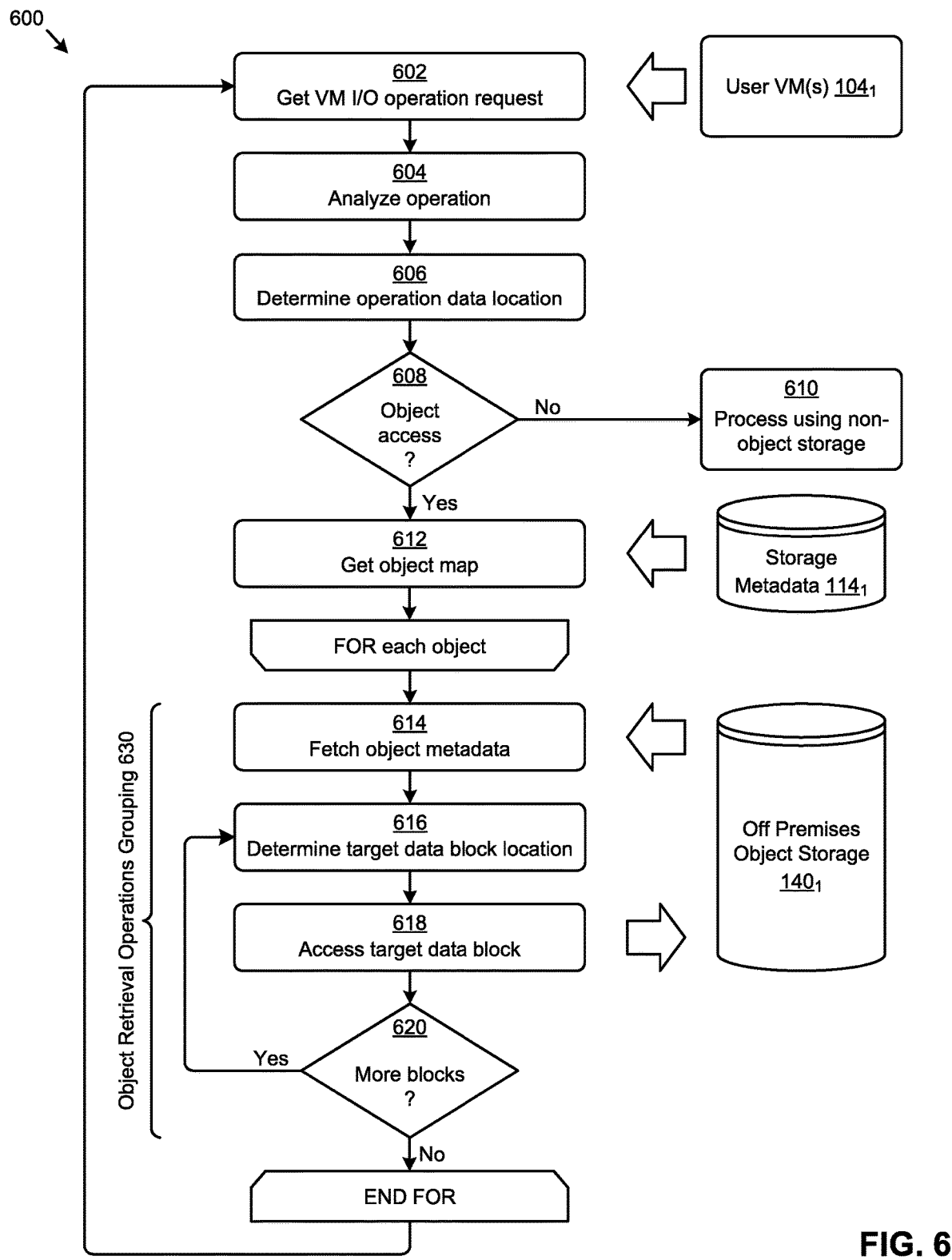
FIG. 6 depicts an object retrieval technique as implemented in systems for generating off-premises storage objects from data access patterns, according to some embodiments.

The subsystem 300 depicted in FIG. 3 presents merely one partitioning. The specific example shown is purely exemplary, and other partitioning is reasonable. Further details pertaining to the herein disclosed techniques facilitated by such systems, subsystems, and/or partitionings for generating off-premises storage objects from data access patterns are shown in FIG. 4, FIG. 5, and FIG. 6.

Figure 4:
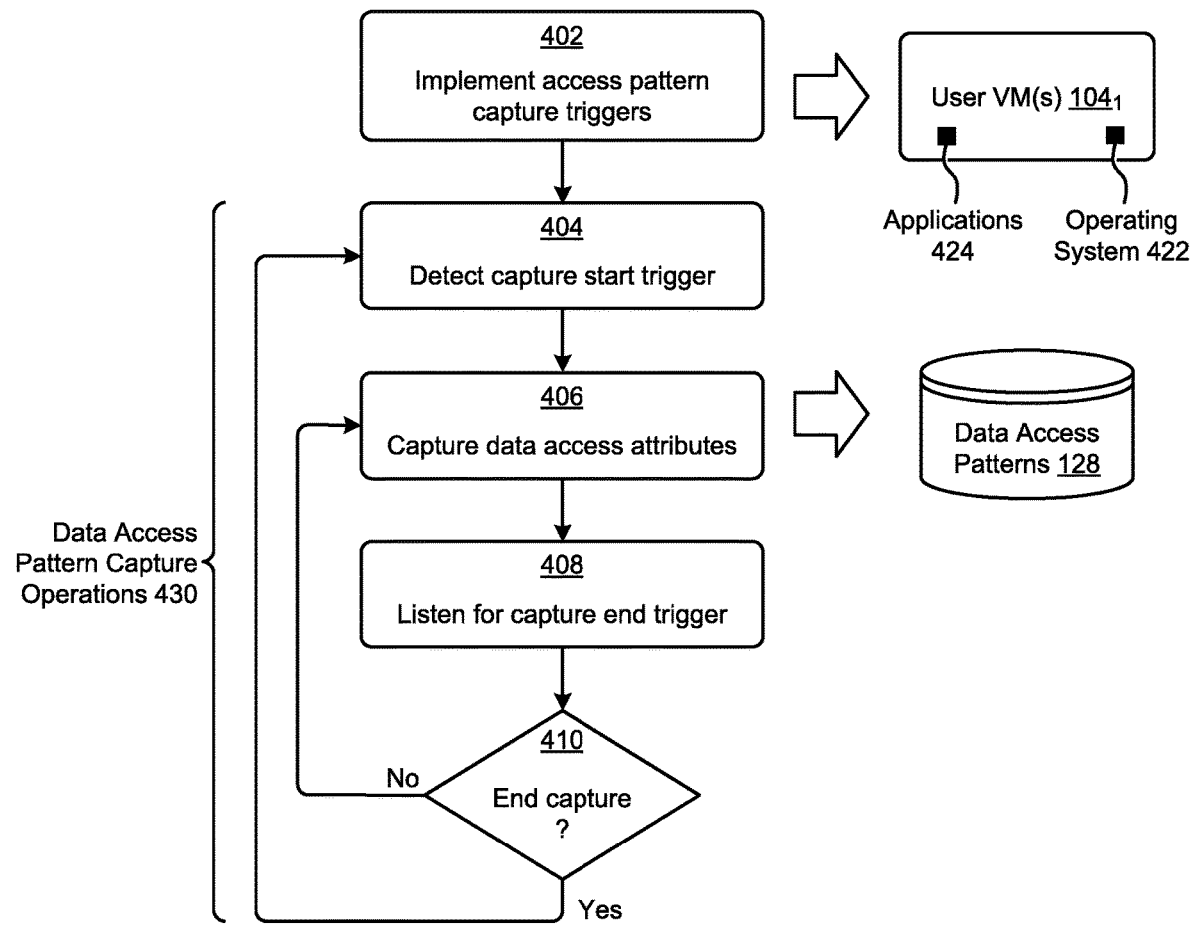
FIG. 4 depicts a data access pattern capture technique as used in systems for generating off-premises storage objects from data access patterns, according to some embodiments.

FIG. 4 depicts a data access pattern capture technique 400 as used in systems for generating off-premises storage objects from data access patterns. As an option, one or more variations of data access pattern capture technique 400 or any aspect thereof may be implemented in the context of the architecture and functionality of the embodiments described herein. The data access pattern capture technique 400 or any aspect thereof may be implemented in any environment.

The data access pattern capture technique 400 presents one embodiment of certain steps and/or operations for capturing data access patterns according to the herein disclosed techniques. In one or more embodiments, the steps and underlying operations comprising the data access pattern capture operations 430 shown in FIG. 4 can be executed by an instance of the storage object generation engine $162_1$ described in FIG. 3.

As shown, the data access pattern capture technique 400 can commence with implementing one or more access pattern capture triggers to invoke and/or end various instances of data access pattern capture operations 430 (step 402). For example, such triggers might be implemented in an operating system 422 (e.g., to capture a boot up sequence) and/or one or more instances of applications 424 (e.g., to capture an application launch sequence) at the user VMs $104_1$. In some cases, the capture window might be based on a fixed time (e.g., 2 seconds). When the trigger start is detected (step 404), the various data access attributes can be captured (step 406). As an example, such attributes can be stored in the data access patterns 128. The data access pattern capture technique 400 can listen for a capture end trigger (step 408) to determine if the capture should continue (see "No" branch of decision 410) or if the capture should end (see "Yes" branch of decision 410). If the then current capture is ended, the process can return to detect the start of the next capture cycle.

FIG. 5 depicts an object generation technique 500 as implemented in systems for generating off-premises storage objects from data access patterns. As an option, one or more variations of object generation technique 500 or any aspect thereof may be implemented in the context of the architecture and functionality of the embodiments described herein. The object generation technique 500 or any aspect thereof may be implemented in any environment.

The object generation technique 500 presents one embodiment of certain steps and/or operations for generating objects according to the herein disclosed techniques. In one or more embodiments, the steps and underlying operations comprising the object generation technique 500 can be executed by an instance of the storage object generation engine $162_1$ described in FIG. 3.

As shown, the object generation technique 500 can commence with receiving a request to move certain subject data blocks (e.g., logical file or virtual disk comprising a snapshot) to an object storage facility (step 501). The subject data block associations pertaining to captured accessed patterns can then be determined (step 502). For example, the object generation technique 500 might determine such associations from the data access pattern attributes 174$_1$ characterizing the data access patterns 128. Certain object constraints might then be determined (step 504). For example, the object rules 328 might indicate the maximum physical size of an object might be 2 MB.

Certain steps and/or operations can then be executed for each object being generated from the subject data blocks (see object generation operation grouping 530). Specifically, for each object, a set of associated data blocks can be selected for the object (step 506). The attributes for the selected data blocks can be collected (step 508) to add the selected blocks to the object (step 510). For example, certain block attributes (e.g., address offset, block identifier, etc.) can be fetched from the mapping metadata 114$_1$ to include in an object map that maps the selected data blocks to the object being generated. If more data blocks are to be added to the object (see "Yes" path of decision 512) then the process can return to select additional data blocks (step 506). For example, another set of associated data blocks might be selected to include in the object and/or a set of data blocks void of access associations might be selected to fill out the object to the target size. If no more data blocks are to be added to the object (see "No" path of decision 512), a set of object metadata can be appended to the object (step 514). The generated object can then be moved to the persistent object storage facility (step 516). For example, the object might be stored in the off-premises object storage 140$_1$. The process can continue for the next object associated with the data move request (see object generation operation grouping 530).

FIG. 6 depicts an object retrieval technique 600 as implemented in systems for generating off-premises storage objects from data access patterns. As an option, one or more variations of object retrieval technique 600 or any aspect thereof may be implemented in the context of the architecture and functionality of the embodiments described herein. The object retrieval technique 600 or any aspect thereof may be implemented in any environment.

The object retrieval technique 600 presents one embodiment of certain steps and/or operations for accessing objects generated according to the herein disclosed techniques for generating off-premises storage objects from data access patterns. In one or more embodiments, the steps and underlying operations comprising the object retrieval technique 600 can be executed by an instance of the virtualized controller described in FIG. 3.

As shown, the object retrieval technique 600 can commence with receiving a request for a VM I/O operation (step 602). For example, such a request might be received from an instance of the user VMs 104$_1$. The operation request can be analyzed (step 604) to determine the location of the data for servicing the operation (step 606). If persistent object access is not to be used for servicing the operation (see "No" path of decision 608), then the operation can be processed using non-object storage (step 610). If persistent object access is to be used for servicing the operation (see "Yes" path of decision 608), then the object map for the data blocks pertaining to the operation can be retrieved (step 612). For example, the object map might be retrieved from the mapping metadata 114$_1$.

Using the object map information and/or other information, certain steps and/or operations can then be executed for each object being accessed (see object retrieval operations grouping 630). Specifically, the object metadata appended to the object can be fetched (step 614). As an example, object metadata might be fetched from the off-premises object storage 140$_1$. Using the object metadata and/or other information, the location of a subject data block can be determined (step 616) to facilitate access of the subject data block (step 618). If more data blocks are to be accessed (see "Yes" path of decision 620), the process can return to determine the location of the next target data block. If no further data blocks for the object are to be accessed (see "No" path of decision 620), the process can continue for the next object associated with the operation request (see object access operations grouping 630) or return to listening for the next VM I/O operation request (step 602).

Additional Embodiments of the Disclosure

Additional Practical Application Examples

Figure 7:
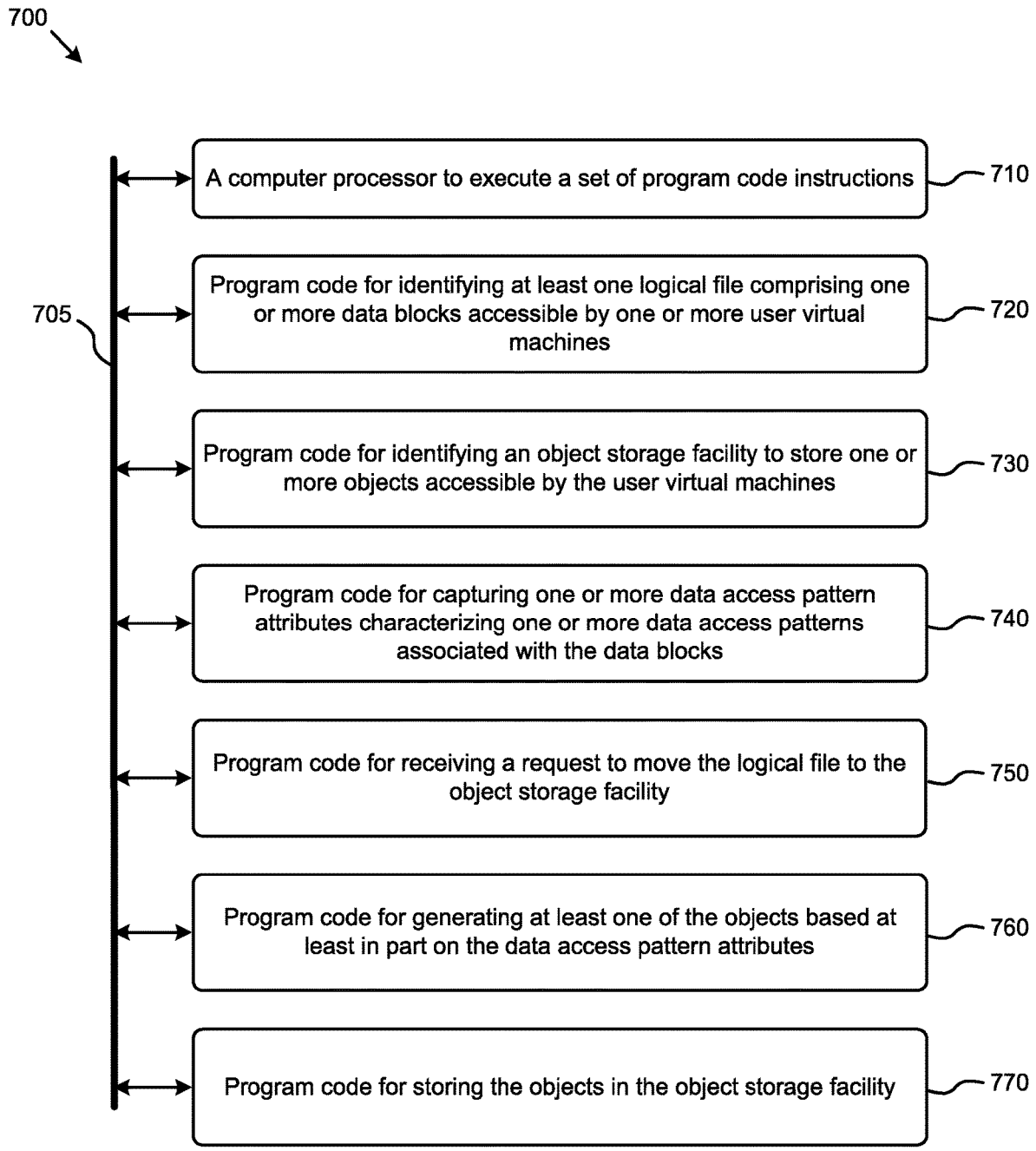
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising a computer processor to execute a set of program code instructions (module 710) and modules for accessing memory to hold program code instructions to perform: identifying at least one logical file comprising one or more data blocks accessible by one or more user virtual machines (module 720); identifying an object storage facility to store one or more objects accessible by the user virtual machines (module 730); capturing one or more data access pattern attributes characterizing one or more data access patterns associated with the data blocks (module 740); receiving a request to move the logical file to the object storage facility (module 750); generating at least one of the objects based at least in part on the data access pattern attributes (module 760); and storing the objects in the object storage facility (module 770).

The foregoing depiction of system 700 supports many embodiments. Strictly as example variations, the shown system 700 supports uses and variations such as:

A variation wherein generating at least one off-premises storage object comprises steps for collecting data READ operation pattern attributes corresponding to the virtual disk, determining one or more subsets of the data blocks associated by a respective one of the READ operation pattern attributes, and building the off-premises storage object from the subsets of the data blocks.

A variation further comprising appending a set of object metadata to the off-premises storage object.

A variation wherein the object metadata describes at least one of, a data block identifier, or a data block address offset.

A variation further comprising updating a set of mapping metadata to facilitate ongoing low latency access to the off-premises storage object.

A variation wherein the metadata comprises an object map to map between data blocks and the off-premises storage object.

A variation wherein the object map comprises at least one of, a virtual disk identifier, a logical file identifier, a data block address offset, or an object identifier.

A variation further comprising receiving one or more access pattern capture trigger signals to invoke or end the capturing of the data access patterns.

A variation wherein the access pattern capture trigger signals correspond to at least one of, one or more operations, one or more processes, one or more sequences, a boot sequence, or an application launch sequence.

A variation wherein the object storage facility is associated with at least one of, a cloud storage facility, or an off-premises object storage facility.

A variation wherein the data access patterns correspond to at least one of, an operation identifier, a sequence identifier, an access frequency value, a timestamp, a virtual disk identifier, a logical file identifier, a data block identifier, or an address offset.

A variation wherein the generation of the objects is based at least in part on a set of object rules.

A variation, wherein the object rules correspond to at least a target size.

Variations of the foregoing may include more or fewer of the foregoing modules and variations may perform more or fewer (or different) steps, and may use data elements in more or fewer (or different) operations.

System Architecture Overview

Additional System Architecture Examples

Figure 8A:
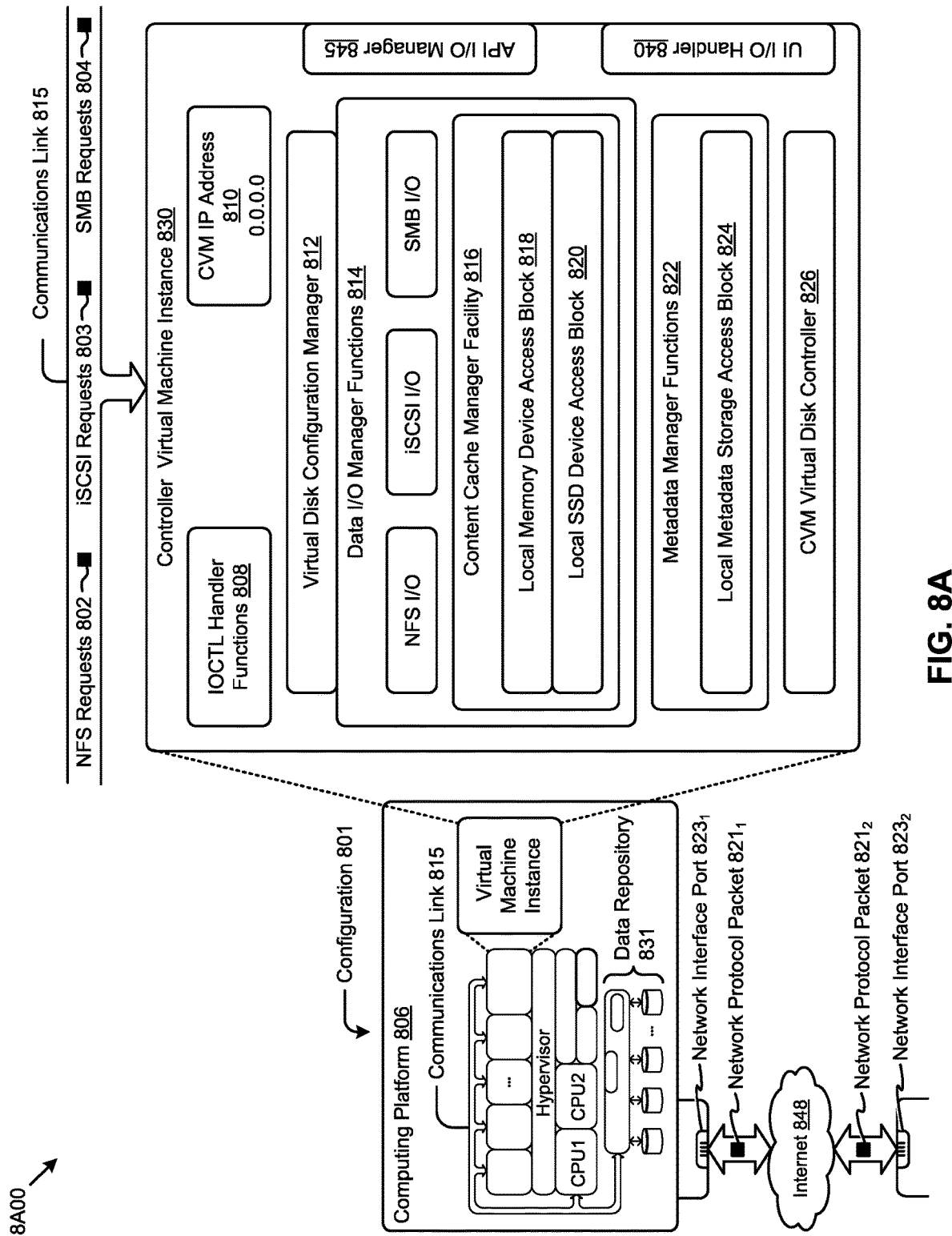
FIG. 8A and FIG. 8B depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The virtual machine architecture comprises a collection of interconnected components suitable for implementing embodiments of the present disclosure and/or for use in the herein-described environments. Moreover, the shown virtual machine architecture 8A00 includes a virtual machine instance in a configuration 801 that is further described as pertaining to the controller virtual machine instance 830. A controller virtual machine instance receives block I/O (input/output or I/O) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., see CVM IP address 810). Various forms of input and output (I/O or IO) can be handled by one or more IO control handler functions (see IOCTL functions 808) that interface to other functions such as data IO manager functions 814 and/or metadata manager functions 822. As shown, the data IO manager functions can include communication with a virtual disk configuration manager 812 and/or can include direct or indirect communication with any of various block IO functions (e.g., NFS IO, iSCSI IO, SMB IO, etc.).

In addition to block IO functions, the configuration 801 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

The communications link 815 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 830 includes a content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). An external data repository 831 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 824. The external data repository 831 can be configured using a CVM virtual disk controller 826, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 801 can be coupled by a communications link 815 (e.g., backplane, LAN, PTSN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). The configuration 801 can be addressed through one or more network interface ports using an IP address. Any operational element within computing platform 806 can perform sending and receiving operations using any of a range of network protocols, possibly including network protocols that send and receive packets (e.g., see network protocol packet $821_1$ and network protocol packet $821_2$).

The computing platform 806 may transmit and receive messages that can be composed of configuration data, and/or any other forms of data and/or instructions organized into a data structure (e.g., communications packets). In some cases, the data structure includes program code instructions (e.g., application code) communicated through Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or results of executing program code can be delivered to a particular user via a download (e.g., a download from the computing platform 806 over the Internet 848 to an access device).

The configuration 801 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of the embodiments Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of any embodiment. Such files or records can be brought into and/or stored in volatile or non-volatile memory.

Figure 8B:
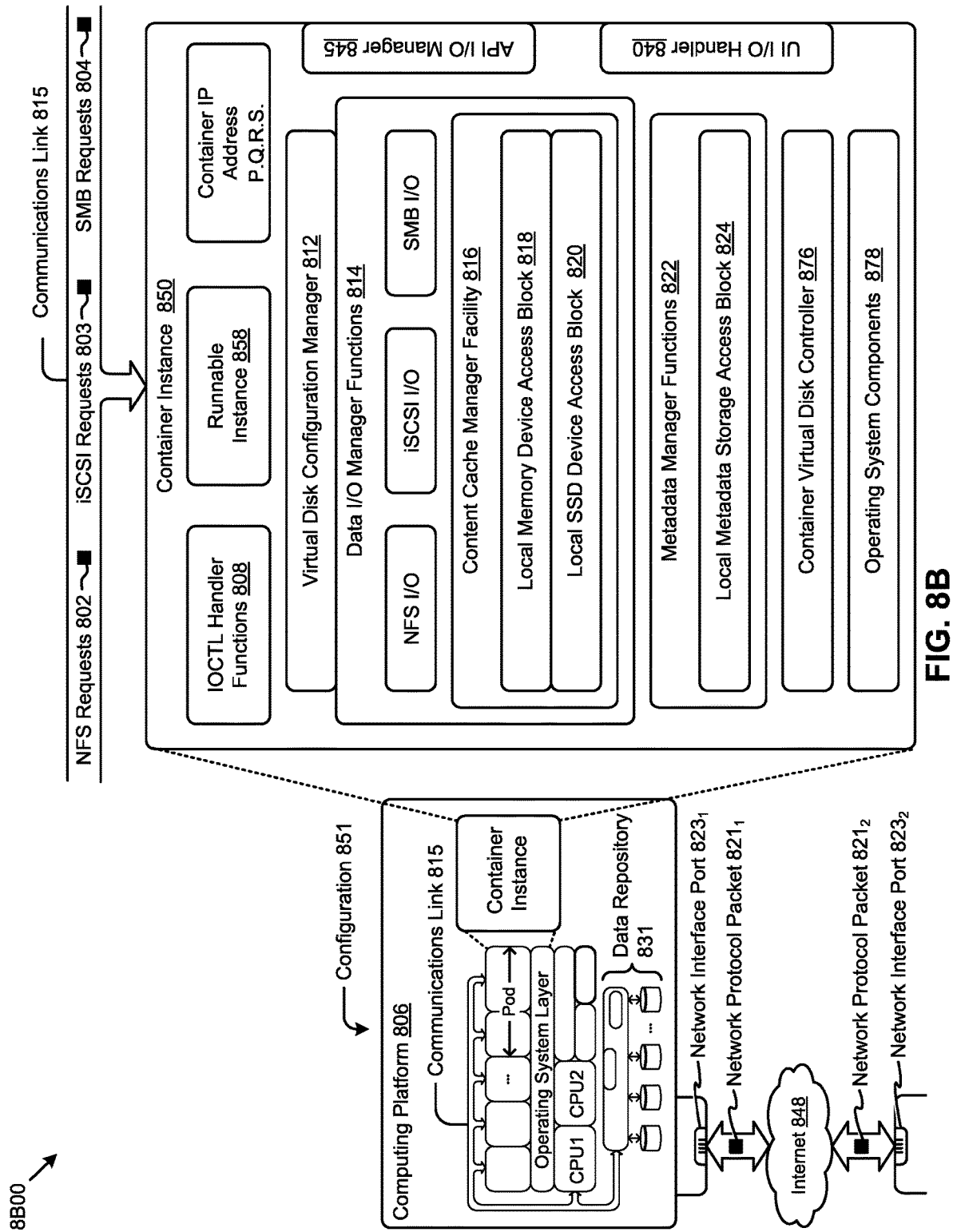

FIG. 8B depicts a virtualized controller implemented by a containerized architecture 8B00. The containerized architecture comprises a collection of interconnected components suitable for implementing embodiments of the present disclosure and/or for use in the herein-described environments. Moreover, the shown containerized architecture 8B00 includes a container instance in a configuration 851 that is further described as pertaining to the container instance 850. The configuration 851 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 850). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code steps and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls–a", etc.). The container might optionally include operating system components 878, however such a separate set of operating system components need not be provided. As an alternative, a container can include a runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
generating a storage object at an on-premises storage facility for storage at an off-premises storage facility, the on-premises storage facility comprising block-based storage and the off-premises storage facility comprising object-based storage, wherein the storage object comprises a set of data blocks that is amalgamated based at least in part on a data access pattern determined from an observed history of accesses to the set of data blocks, the data access pattern corresponding to at least two data blocks being accessed in a sequence, generating the storage object comprises collecting data READ operation pattern attributes corresponding to the set of data blocks to determine a subset of the set of data blocks associated by a data READ operation pattern attribute of the data READ operation pattern attributes, and the storage object is built from the subsets of the set of data blocks; and
transmitting the storage object from the on-premises storage facility to the off-premises storage facility.

2. The method of claim 1, wherein the data access pattern corresponds to at least one of, an operation identifier, a sequence identifier, an access frequency value, a timestamp, a virtual disk identifier, a logical file identifier, a data block identifier, or an address offset.

3. The method of claim 1, further comprising appending a set of object metadata to storage object, wherein the set of object metadata describes at least one of, a data block identifier, or a data block address offset.

4. The method of claim 1, wherein generating the storage object is based at least in part on a set of object rules.

5. The method of claim 1, further comprising updating a set of mapping metadata pertaining to the storage object.

6. The method of claim 1, further comprising receiving an access pattern capture trigger signal to invoke or end capture of the data access pattern.

7. The method of claim 6, wherein the access pattern capture trigger signals correspond to at least one of, an operation, a process, a sequence, a boot sequence, or an application launch sequence.

8. The method of claim 1, wherein the off-premises storage facility is a cloud storage facility.

9. A non-transitory computer readable medium having stored thereon a sequence of instructions which executed by a processor performs a set of acts, the set of acts comprising:
generating a storage object at an on-premises storage facility for storage at an off-premises storage facility, the on-premises storage facility comprising block-based storage and the off-premises storage facility comprising object-based storage, wherein the storage object comprises a set of data blocks that is amalgamated based at least in part on a data access pattern determined from an observed history of accesses to the set of data blocks, the data access pattern corresponding to at least two data blocks being accessed in a sequence, generating the storage object comprises collecting data READ operation pattern attributes corresponding to the set of data blocks to determine a subset of the set of data blocks associated by a data READ operation pattern attribute of the data READ operation pattern attributes, and the storage object is built from the subsets of the set of data blocks; and
transmitting the storage object from the on-premises storage facility to the off-premises storage facility.

10. The computer readable medium of claim 9, wherein the data access pattern corresponds to at least one of, an operation identifier, a sequence identifier, an access frequency value, a timestamp, a virtual disk identifier, a logical file identifier, a data block identifier, or an address offset.

11. The computer readable medium of claim 9, wherein generating the storage object is based at least in part on a set of object rules.

12. The computer readable medium of claim 9, wherein the set of acts further comprise appending a set of object metadata to storage object, wherein the set of object metadata describes at least one of, a data block identifier, or a data block address offset.

13. The computer readable medium of claim 9, wherein the set of acts further comprise updating a set of mapping metadata pertaining to the storage object.

14. The computer readable medium of claim 9, wherein the set of acts further comprise receiving an access pattern capture trigger signal to invoke or end capture of the data access pattern.

15. The computer readable medium of claim 14, wherein the access pattern capture trigger signals correspond to at least one of, an operation, a process, a sequence, a boot sequence, or an application launch sequence.

16. The computer readable medium of claim 9, wherein the off-premises storage facility is a cloud storage facility.

17. A system comprising:
a storage medium having stored thereon a sequence of instructions; and
a processor that executes the sequence of instructions to perform a set of acts, the set of acts comprising:
generating a storage object at an on-premises storage facility for storage at an off-premises storage facility, the on-premises storage facility comprising block-based storage and the off-premises storage facility comprising object-based storage, wherein the storage object comprises a set of data blocks that is amalgamated based at least in part on a data access pattern determined from an observed history of accesses to the set of data blocks, the data access pattern corresponding to at least two data blocks being accessed in a sequence, generating the storage object comprises collecting data READ operation pattern attributes corresponding to the set of data blocks to determine a subset of the set of data blocks associated by a data READ operation pattern attribute of the data READ operation pattern attributes, and the storage object is built from the subsets of the set of data blocks; and transmitting the storage object from the on-premises storage facility to the off-premises storage facility.

18. The system of claim 17, wherein the set of acts further comprise updating a set of mapping metadata pertaining to the storage object.

19. The system of claim 17, wherein the set of acts further comprise appending a set of object metadata to storage object, wherein the set of object metadata describes at least one of, a data block identifier, or a data block address offset.

20. The system of claim 17, wherein the set of acts further comprise receiving an access pattern capture trigger signal to invoke or end capture of the data access pattern.

21. The system of claim 20, wherein the access pattern capture trigger signals correspond to at least one of, an operation, a process, a sequence, a boot sequence, or an application launch sequence.

22. The system of claim 17, wherein the off-premises storage facility is a cloud storage facility.

23. The system of claim 17, wherein the data access pattern corresponds to at least one of, an operation identifier, a sequence identifier, an access frequency value, a timestamp, a virtual disk identifier, a logical file identifier, a data block identifier, or an address offset.

24. The system of claim 17, wherein generating the storage object is based at least in part on a set of object rules.

25. A non-transitory computer readable medium having stored thereon a sequence of instructions which executed by a processor performs a set of acts, the set of acts comprising:

generating a storage object, the storage object comprising a set of data blocks from an on-premises storage facility that is amalgamated for storage at an off-premises storage facility, the on-premises storage facility comprising block-based storage and the off-premises storage facility comprising object-based storage, wherein the set of data blocks is amalgamated based at least in part on a data access pattern determined from an observed history of accesses to the set of data blocks, the data access pattern corresponding to at least two data blocks being accessed in a sequence, generating the storage object comprises collecting data READ operation pattern attributes corresponding to the set of data blocks to determine a subset of the set of data blocks associated by a data READ operation pattern attribute of the data READ operation pattern attributes, and the storage object is built from the subsets of the set of data blocks; and transmitting the storage object for storage at the off-premises storage facility.

26. The computer readable medium of claim 25, wherein the data access pattern corresponds to at least one of, an operation identifier, a sequence identifier, an access frequency value, a timestamp, a virtual disk identifier, a logical file identifier, a data block identifier, or an address offset.

27. The computer readable medium of claim 25, wherein a set of object metadata appended to the storage object describes at least one of, a data block identifier, or a data block address offset.

28. The computer readable medium of claim 25, wherein the off-premises storage facility is a cloud storage facility.

29. The computer readable medium of claim 25, wherein the data access pattern corresponds to at least one of, an operation identifier, a sequence identifier, an access frequency value, a timestamp, a virtual disk identifier, a logical file identifier, a data block identifier, or an address offset.

* * * * *